(12) United States Patent
Naveh et al.

(10) Patent No.: US 7,237,128 B2
(45) Date of Patent: Jun. 26, 2007

(54) METHOD AND APPARATUS TO DYNAMICALLY CHANGE AN OPERATING FREQUENCY AND OPERATING VOLTAGE OF AN ELECTRONIC DEVICE

(75) Inventors: Alon Naveh, Ramat Hasharon (IL); Roman Surgutchik, Santa Clara, CA (US); Stephen H. Gunther, Beaverton, OR (US); Robert Greiner, Beaverton, OR (US); Hung-Piao Ma, Portland, OR (US); Kevin Dai, San Jose, CA (US); Keng L. Wong, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 413 days.

(21) Appl. No.: 10/855,268

(22) Filed: May 26, 2004

(65) Prior Publication Data

US 2006/0156040 A1   Jul. 13, 2006

Related U.S. Application Data

(63) Continuation-in-part of application No. 10/272,154, filed on Oct. 14, 2002, now Pat. No. 7,013,406.

(51) Int. Cl.
*G06F 1/00* (2006.01)
*H03B 19/00* (2006.01)

(52) U.S. Cl. .................. 713/322; 713/320; 327/113
(58) Field of Classification Search ............... None
See application file for complete search history.

(56) References Cited

U.S. PATENT DOCUMENTS 5,281,100 A * 1/1994 Diederich .............. 417/18
5,307,003 A    4/1994 Fairbanks et al.
5,502,838 A    3/1996 Kikinis
5,627,412 A    5/1997 Beard
5,745,375 A    4/1998 Reinhardt et al.
5,787,294 A    7/1998 Evoy
5,812,860 A    9/1998 Horden et al.

(Continued)

FOREIGN PATENT DOCUMENTS

EP    1286248    2/2003

(Continued)

OTHER PUBLICATIONS

PCT International Search Report, PCT/US2003/030573, 4 pages.

(Continued)

*Primary Examiner*—A. Elamin
*Assistant Examiner*—Anand B. Patel
(74) *Attorney, Agent, or Firm*—Blakely, Sokoloff, Taylor & Zafman LLP

(57) ABSTRACT

In one embodiment, there is provided a method comprising determining a target operating point for an electronic device, the target operating point including a target operating frequency and a target operating voltage; and dynamically changing a current operating point for the electronic device including a current operating frequency and a current operating voltage by non-contemporaneously changing the current operating frequency to the target operating frequency and a current operating voltage to the target operating voltage, wherein during the changing the electronic device is in an active state.

28 Claims, 4 Drawing Sheets

U.S. PATENT DOCUMENTS

| | | |
|---|---|---|
| 5,918,061 A | 6/1999 | Nikjou |
| 5,953,685 A | 9/1999 | Bogin et al. |
| 6,047,248 A | 4/2000 | Georgiou et al. |
| 6,211,740 B1 | 4/2001 | Dai et al. |
| 6,363,490 B1 | 3/2002 | Senyk |
| 6,393,374 B1 | 5/2002 | Rankin et al. |
| 6,415,388 B1 | 7/2002 | Browning et al. |
| 6,457,082 B1 | 9/2002 | Zhang et al. |
| 6,557,068 B2 | 4/2003 | Riley et al. |
| 6,714,891 B2 | 3/2004 | Dendinger |
| 6,789,037 B2 | 9/2004 | Gunther et al. |
| 6,836,849 B2 * | 12/2004 | Brock et al. ............... 713/310 |
| 6,885,233 B2 | 4/2005 | Huard et al. |
| 6,980,918 B2 | 12/2005 | Gunther et al. |
| 7,000,130 B2 * | 2/2006 | Adachi ..................... 713/322 |
| 7,013,406 B2 | 3/2006 | Naveh et al. |
| 7,076,672 B2 | 7/2006 | Naveh et al. |
| 7,158,911 B2 | 1/2007 | Gunther et al. |
| 2002/0083355 A1 | 6/2002 | Clark et al. |
| 2002/0083356 A1 | 6/2002 | Dai |
| 2004/0098631 A1 | 5/2004 | Terrell |
| 2004/0125514 A1 | 7/2004 | Gunther et al. |

FOREIGN PATENT DOCUMENTS

| | | |
|---|---|---|
| WO | WO/2001/35200 | 5/2001 |
| WO | WO/2002/17052 | 2/2002 |
| WO | WO 02/29535 A2 | 4/2002 |

OTHER PUBLICATIONS

Invitation to Pay Additional Fees and Annex (partial International Search) from PCT/US2005/028699, mailed Mar. 2, 2006, 10 pages.

* cited by examiner

METHOD AND APPARATUS TO DYNAMICALLY CHANGE AN OPERATING FREQUENCY AND OPERATING VOLTAGE OF AN ELECTRONIC DEVICE

CLAIM OF PRIORITY

The present application is a Continuation-in-Part of application Ser. No. 10/272,154, filed Oct. 14, 2002 now U.S. Pat. No. 7,013,406.

FIELD OF THE INVENTION

Embodiments of this invention relate to electronic devices. In particular, embodiments of this invention relate to changing an operating voltage and an operating frequency of an electronic device.

BACKGROUND OF THE INVENTION

For the purposes of this specification the term "electronic device" should be interpreted broadly to include any electronic device including, but not limited to, microprocessors (processors), chipsets, graphics processors, graphics accelerators, and other data processing devices. Electronic device frequency has increased approximately ten-fold over the last ten years. For example, in the mid-90's electronic devices operating at a frequency of 133 MHz were commonplace whereas today electronic devices are operated at over 1.6 GHz. This increase in electronic device frequency has led to a steep rise in power consumption due both to the high operating frequency as well as high power leakage associated with electronic devices that operate at these higher frequencies.

Consequently, lowering electronic device power consumption is an important consideration when designing modern electronic devices. Electronic devices that operate at lower power are advantageous in that they may operate for longer periods on battery power without having to re-charge the battery.

One technique for lowering the power consumption of an electronic device is to scale the electronic device's operating frequency and operating voltage dynamically based on power consumption and/or performance criteria. For example, if high performance is not required and an electronic device is operating on battery power then the electronic device may be dynamically scaled or switched to operate at a lower frequency in order to conserve power. When the electronic device is connected to a wall socket (AC source) the device may be scaled up to increase its operating frequency.

Lower power consumptions may be achieved by scaling an electronic device's operating voltage in addition to its operating frequency. However, scaling the operating voltage can introduce operating instability in the electronic device. In order to reduce this operating instability all computations for the period of the voltage change are typically stopped. This period can be over 130 µs to allow the voltage to swing from the minimum operating voltage to the maximum operating voltage, and to allow phase locked loop circuits that control the operating frequency of the electronic device to be reset or relocked. It will be appreciated that stopping all computations for such a long period leads to a degradation in the electronic device performance.

Further, during the voltage change memory traffic is typically halted for at least 130 µs since snoop services into the electronic device's caches during the voltage change or swing period are unavailable. This halting of the memory traffic affects isochronous traffic which, typically, cannot stand a delay of over 10–15 µs before data is lost or audio-visual artifacts are visible to a user. In some cases, the caches have to be flushed prior to the voltage swing. This adversely affects electronic device performance and limits cache size due to the flush time penalty.

As discussed above, achieving changes in the operating voltage in the electronic device can result in a total system performance penalty for each change, thereby effectively limiting the number of changes or switches per minute and thus preventing the power mode of the electronic device to track the current performance needs of the electronic device.

SUMMARY OF THE DISCLOSURE

In one embodiment, there is provided a method comprising determining a target operating point for an electronic device, the target operating point including a target operating frequency and a target operating voltage; and dynamically changing a current operating point for the electronic device including a current operating frequency and a current operating voltage by non-contemporaneously changing the current operating frequency to the target operating frequency and a current operating voltage to the target operating voltage, wherein during the changing the electronic device is in an active state.

DETAILED DESCRIPTION OF THE DRAWINGS

Reference in this specification to "one embodiment" or "an embodiment" indicates that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be limited by some embodiments and not by others. Similarly, various requirements are described which may be requirements for some embodiments but not other embodiments.

Figure 1:
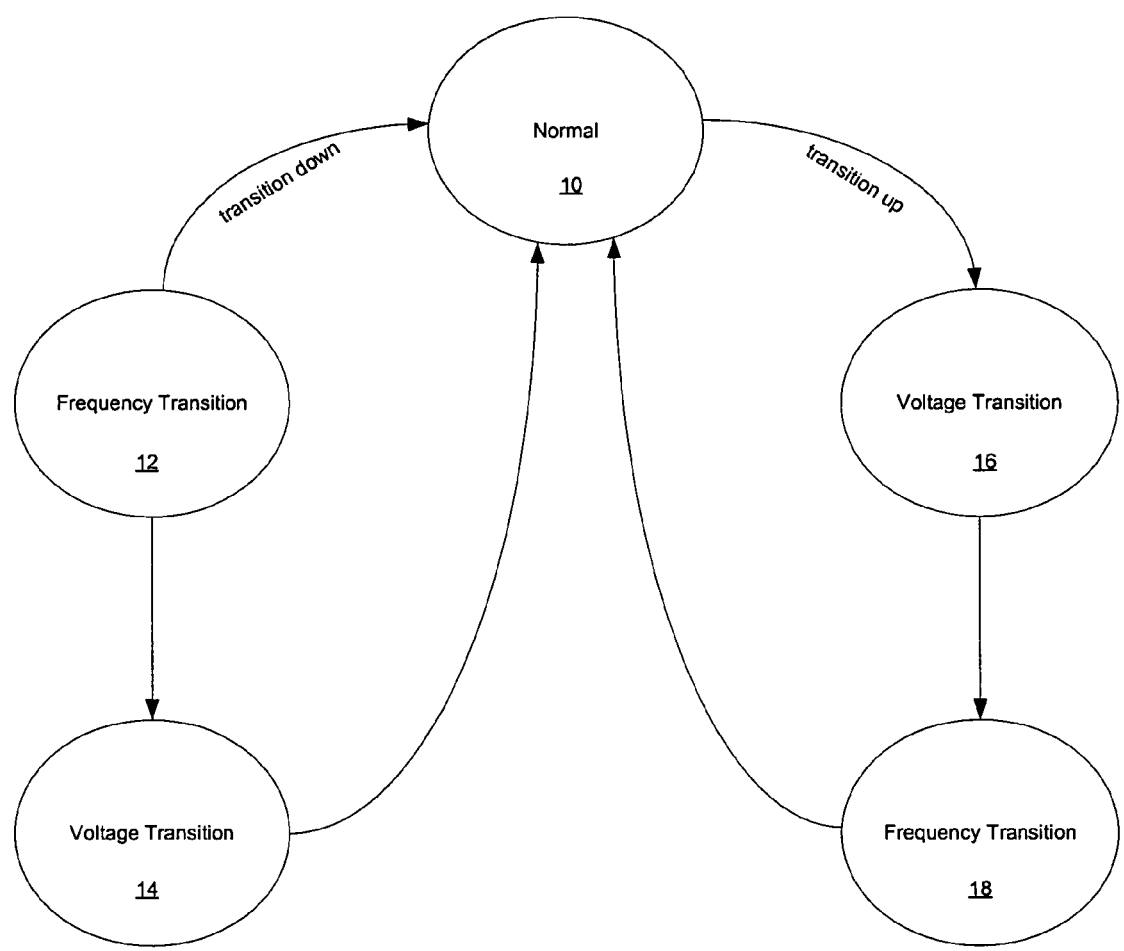
FIG. 1 shows a high-level block diagram for an electronic device in accordance with one embodiment of the invention.

FIG. 1 of the drawings shows a state diagram of various states for an electronic device in the form of a processor in accordance with one embodiment. Referring to FIG. 1, reference numeral 10 indicates a normal state of operation for the processor. In this normal state 10, the processor operates at an operating point comprising a current operating frequency and a current operating voltage. In the normal state 10, the performance of the processor is matched to the operating point at which the processor is operating. In other words, the normal state 10 is that state of the processor in which the operating point of the processor is such that the processor is operating at an operating frequency and operating voltage that is what is required both in terms of performance requirements of the processor as well as power consumption requirements.

In one embodiment the processor will leave its normal state 10 if, for example, there is an increased performance requirement in which case the operating point of the processor needs to be raised. Alternatively, the processor leaves its normal state 10 if there is a need to conserve power, in which case the operating point of the processor is lowered. Aspects of the present invention involve determining a target operating point for the processor. According to embodiments of the invention, the target operating point may be determined based on processor operating parameters such as temperature, power consumption, etc. In one case, in order to lower the operating point of the processor to a target operating point that is lower than the operating point associated with the normal state 10, the processor first enters a frequency transition stage 12 in which the operating frequency of the processor is lowered to a value below the operating frequency of the processor in the normal state 10. The particular operations performed during the frequency transition stage 12 will be described in greater detail below.

After execution of the frequency transition stage 12, the processor enters a voltage transition stage 14. During the voltage transition stage 14, the operating voltage of the processor is lowered from the operating voltage associated with the normal state 10 to a target operating voltage which is below the operating voltage associated with the normal state 10. After executing the voltage transition stage 14, the processor is once again in the normal state 10 since the current demands both in terms of processing speed (performance) and power consumption will be matched to the current operating point of the processor.

In another case, in order to transition the operating point of the processor from its operating point in the normal state 10 to a higher operating point, the processor first enters a voltage transition stage 16 in which the operating voltage associated with a normal state 10 is transitioned to a higher target operating voltage, and after execution of the voltage transition state 16, a frequency transition stage 18 is executed during which an operating frequency of the processor associated with the normal state 10 is transitioned to a higher operating frequency. After execution of the frequency transition stage 18, the processor is once again in the normal state 10 since it will now be operating at an operating point comprising an operating voltage and an operating frequency that is matched to what is required both in terms of power consumption and processor performance. In some embodiments, the voltage transition stages 16 and 14 invoke the same or similar operations, and the frequency transition stages 12 and 18 involve the same or similar operations.

Figure 2:
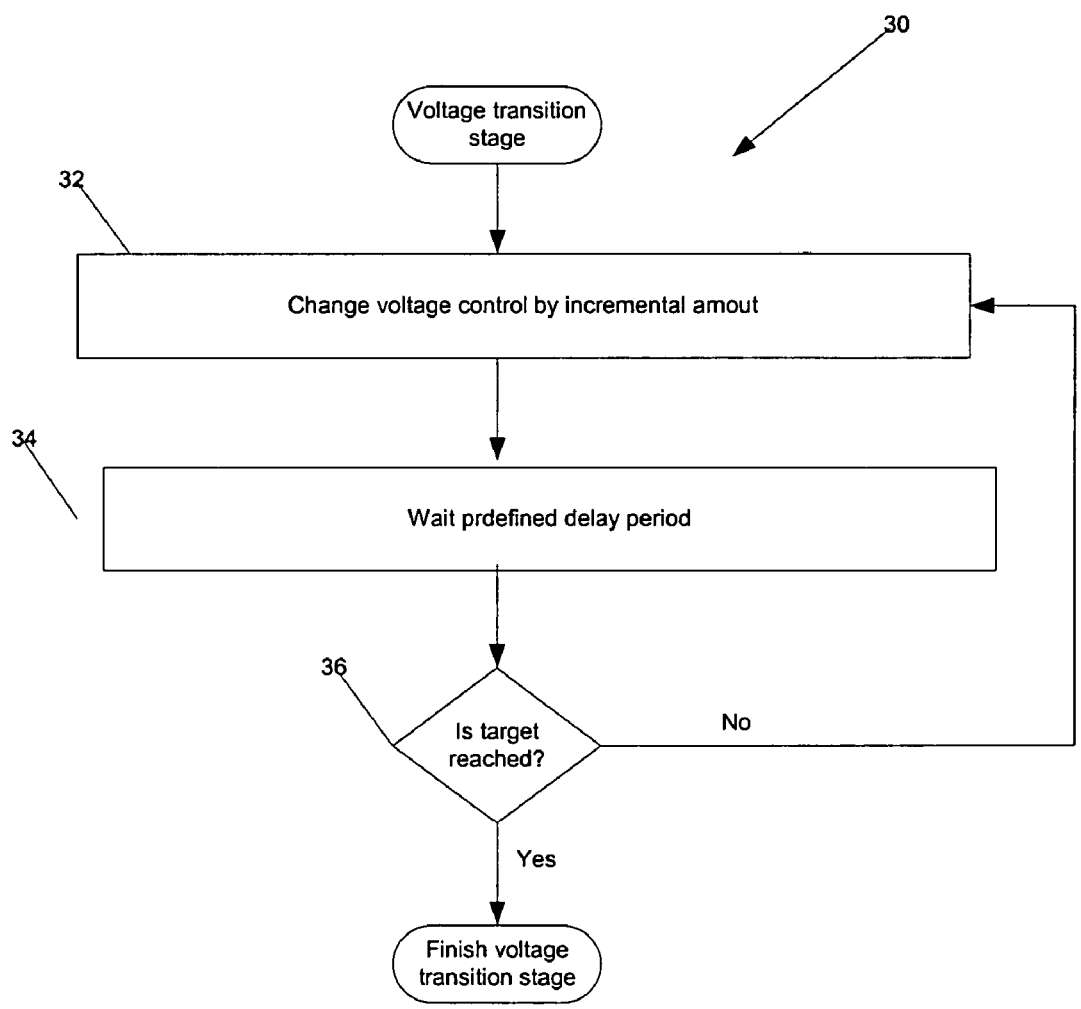
FIG. 2 shows a flowchart of operations performed during a voltage transition stage in accordance with one embodiment of the invention.

Referring now to FIG. 2, reference numeral 30 indicates a flowchart of operations that are performed during voltage transition stages 14 and 16, in accordance with one embodiment of the invention. As noted above, the voltage transition stages 14 and 16 are entered when the processor determines that its current operating voltage is different from a target operating voltage which in the case of the voltage transition stage 14 is lower, and which in the case of the voltage transition stage 16 is higher. At block 32, an operation is performed to change the current operating voltage of the processor by an incremental amount. This incremental amount will be different for different processors, but in one embodiment is a small amount in the range of between 5–50 mV. In one embodiment, the size of each increment is set at a value that represents an incremental voltage change that can be tolerated by a processor without giving rise to operating instability.

At block 34, after changing the voltage incrementally, the processor waits a predefined period during which circuitry of the processor is allowed to adjust to the new operating voltage. Thus, by interspersing each increment in time, clock circuitry and logic timing circuitry associated with the processor are able to continue operation in a manner that is transparent to software (i.e., the processor remains in an active state.) In one embodiment, the predefined waiting period is between 5–30 μs. At block 32, a check is performed to determine if the target operating voltage has been reached. If the target operating voltage has not been reached then block 32 re-executes, otherwise the voltage transition state is exited. During the voltage transition stages 14 and 16, the processor remains in an active state wherein the processor is able to continue executing code and memory transactions on a processor bus coupled to the processor are still possible.

Figure 3:
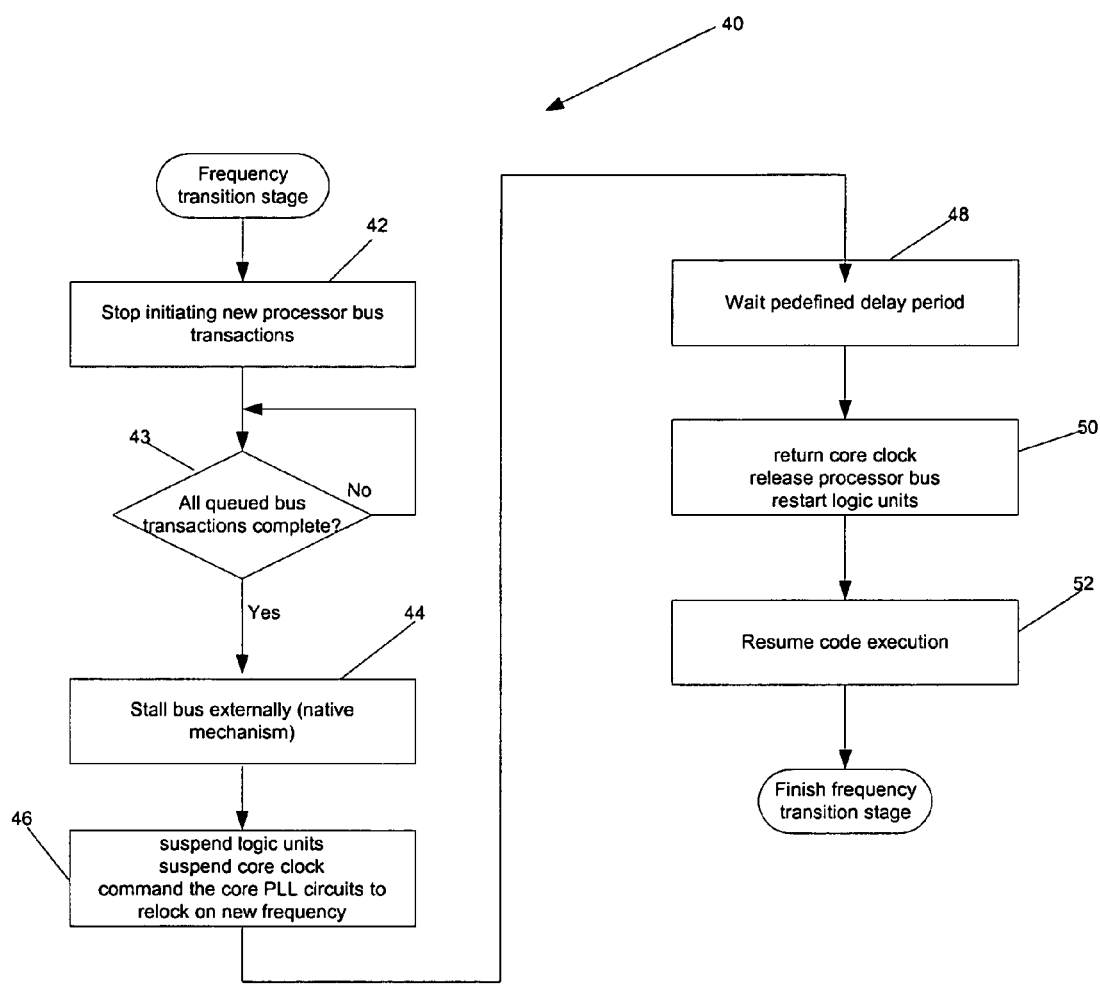
FIG. 3 shows a flowchart of operations performed during a frequency transition stage in accordance with one embodiment of the invention.

Referring now to FIG. 3 of the drawings, reference numeral 40 generally indicates a flowchart of operations performed during the frequency transition stages 12 and 18. At block 42, after entering the frequency transition stage 12, 14 the processor stops initiating new bus transactions on a processor bus coupled thereto. At block 43 a check is performed to determine if all pending or queued bus transactions on the processor bus have been completed. Block 43 is re-executed until all bus pending bus transactions have been completed in which case block 44 is executed. The execution of block 44 includes stalling the processor bus using a native bus mechanism. Thereafter, block 46 executes which includes suspending the logic units of the processor, suspending a first (core) clock, which in one case is a core clock, and commanding phase locked loop circuits for the processor core to be set at the target operating frequency.

After execution of block 46, block 48 executes wherein the processor waits a predefined delay period to allow the core phase locked loop circuits to be re-set or to synchronize to the target operating frequency. In some cases, the predefined delayed period may be about 10 μs. In one embodiment, the core phase locked loop circuits generate a signal to indicate that they have been synchronized to the target operating frequency. In this embodiment, the processor waits for the signal before execution of block 40. In some embodiments, the processor may wait for the predefined delay period and for receipt of the signal before execution of block 40. At block 40, the core clock is returned, the processor bus is released, and the suspended logic units are restarted. Thereafter block 52 executes wherein normal code execution is resumed.

Figure 4:
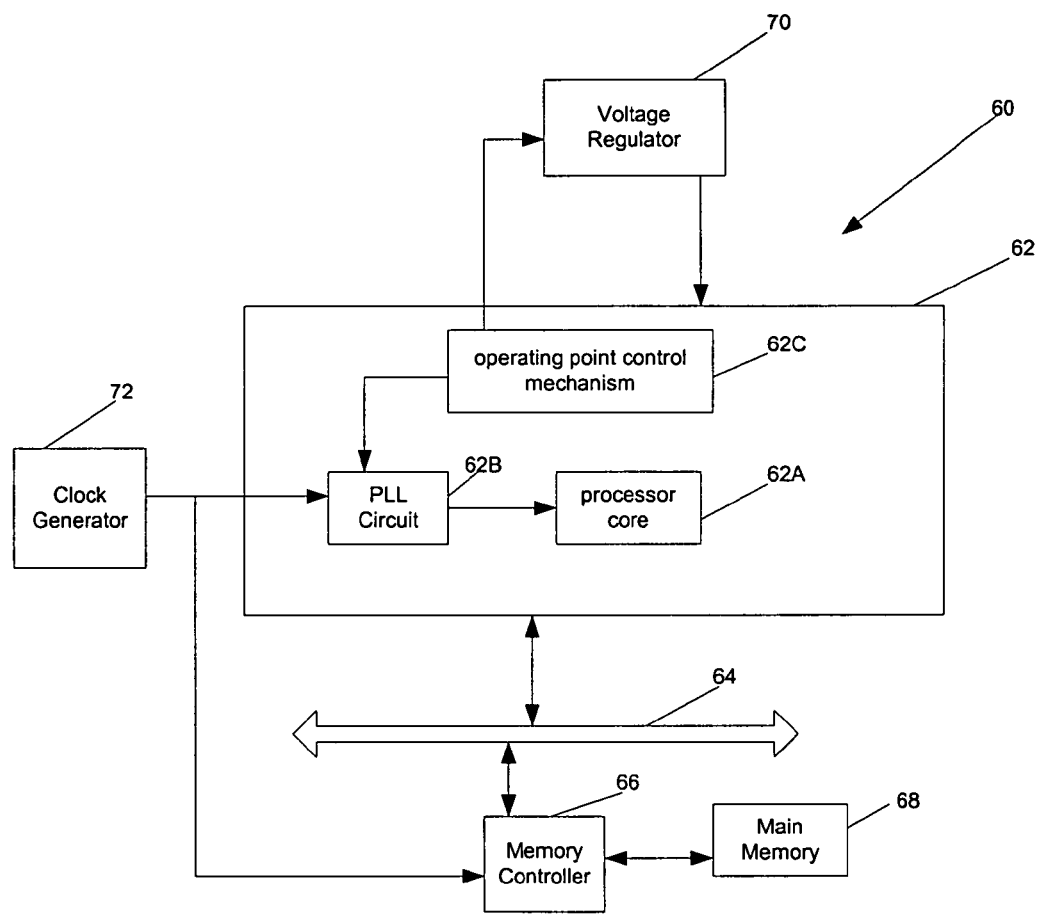
FIG. 4 shows a high-level block diagram of a system in accordance with the invention.

Referring to FIG. 4 of the drawings reference numeral 60 generally indicates a system comprising a processor in accordance with one embodiment of the invention. The system 60 includes a processor 62 which is coupled to a memory controller 66 by a processor bus 64. The memory controller 66 controls memory transactions to and from a main memory 68. The processor is connected to a voltage regulator 70 which regulates the output of a voltage supply (not shown) to the processor 62. The processor 62 includes a processor core 62A, which includes functional units such as an arithmetic and logic unit (ALU), etc. A phase locked loop circuit 62B receives a clock signal from a clock generator 72 and scales the revised clock signal, to a required operating frequency, which scaled clock signal is then fed to the processor core 62A.

The processor 62 also includes an operating point control unit 62C which controls both the phase lock loop circuit 62B and the voltage regulator 70. In use, operating point control unit 62C determines whether the current operating point for the processor 62 is higher or lower than a target operating point. In some cases, this determination may include receiving input from an operating system to scale the operating frequency and operating voltage of the processor 62 in accordance with power and/or performance requirements. In some cases, the current operating point may be determined to be higher than the target operating point when the processor is switched from an AC power source to a battery power source or if the operating computational load is reduced. In other cases, if there is a high processing load the current operating point is determined to be lower than the target operating point.

If the target operating point is higher than the current operating point, then the operating point control unit 62C sends control signals to the phase locked loop circuit 62B and the voltage regulator 70 to increase the operating frequency and the operating voltage for the processor 62. Conversely, if the operating point control mechanism 62C determines that the target operating point is lower than the current operating point, then the operating point control unit 62C sends a control signal to the phase locked loop circuit 62B to cause it to lower the current operating frequency to the target operating frequency. Further, the operating point control unit 62C sends a control signal to the voltage regulator 70 to cause it to send a control signal to lower the operating voltage for the processor 62.

The actual operations performed by the processor 62 in order to change its operating frequency and operating voltage to the target operating voltage and the target operating frequency correspond to the operations performed during the frequency transition stages 12, 18 and voltage transition stages 14, 16 described with reference to FIG. 1 above. Thus, the voltage transition stage is separated from the frequency transition stage and during a transition down to a lowering operating point, the frequency transition is performed first. During a transition up to a higher operating point, the voltage transition is performed first to allow for the higher frequency operation to follow. In one embodiment processor operation and bus traffic on processor bus 64 are not stopped during the voltage transition stages or the frequency transition stages. Further, to reduce operating instability, the voltage transition is performed in small increments (in one embodiment each increment is about 5-50 mVs), and is interspersed in time (about 0.5 to 30 μs apart in one embodiment) so that processor circuitry is not affected by the transition.

In one embodiment, there may be a delay between the completion of the last incremental voltage transition and commencement of a change in the operating frequency. This delay, which in some embodiments may be programmed into the processor, provides time to allow the operating voltage to sterilize before the operation frequency is changed.

While performing the voltage and frequency transitions in a manner described above, the frequency transition stage may be effected, in one embodiment, within a period of the 5-10 μs. Since during the frequency transition phase, the processor bus 64 is operational, traffic to the processor during the transition stages may be blocked by using native bus mechanisms. This allows for lower time overhead (lower latency and impact) and lower implementation cost in a chipset comprising the processor 62. In one embodiment, the frequency transitioning is controlled entirely from within the processor 62 and there is thus no need for an external device to do this. This saves on processor interface pins.

In some embodiments, the operating point control unit 62C has hard coded therein various operating points. Further the amount of each voltage increment and delay periods necessary to implement the techniques described above are also hard coded within the operating point control unit 62C. In other embodiments, these values may exist in firmware. In yet further embodiments, these values may be programmed partially or fully by software.

The logic to perform the processes as described above can be implemented in hardware within the electronic device, or alternatively external to the device. The processes described above can also be stored in the memory of a computer system as a set of instructions to be executed. In addition, the instructions to perform the operations described above could alternatively be stored on other forms of machine-readable media, including magnetic and optical disks. For example, the operations of one embodiment could be stored on machine-readable media, such as magnetic disks or optical disks, which are accessible via a disk drive (or computer-readable medium drive). Further, the instructions can be downloaded into a computing device over a data network in a form of compiled and linked version.

Alternatively, the processes to perform the operations as discussed above, could be implemented in additional computer and/or machine readable media, such as discrete hardware components as large-scale integrated circuits (LSI's), application-specific integrated circuits (ASIC's), firmware such as electrically erasable programmable read-only memory (EEPROM's); and electrical, optical, acoustical and other forms of propagated signals (e.g., carrier waves, infrared signals, digital signals, etc.); etc.

Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense. Thus, for example, in some embodiments the operating point control unit 62C or at least components thereof may be located outside the processor 62, and may form part of a chipset including the processor 62. Moreover, the operating point control unit 62 may be implemented in firmware, software, or hardware. Similarly, the voltage regulator unit 70 or at least components thereof may be located inside the processor 62 or any other part of the chipset.

What is claimed is:

1. A method, comprising:
    determining a target operating point for an electronic device, the target operating point including a target operating frequency and a target operating voltage; and
    dynamically changing a current operating point for the electronic device including a current operating frequency and a current operating voltage by non-contemporaneously changing the current operating frequency to the target operating frequency and the current operating voltage to the target operating voltage, wherein during the changing of the current operating voltage the electronic device is in an active state, and wherein during changing the current operating frequency, an electronic device bus coupled to the electronic device is stalled, a first clock for the electronic device is stopped, and a phase locked loop circuit for a core clock is set to the target operating frequency by waiting a predefined delay period to allow the phase locked loop circuit for the core clock to synchronize to the target operating frequency before restarting the electronic device bus and the core clock.

2. The method of claim 1, wherein in the active state the electronic device performs one of executing instructions and processing input/output transactions on a bus.

3. The method of claim 1, wherein changing the current operating frequency is performed before changing the current operating voltage if the target operating point is lower than the current operating point.

4. The method of claim 1, wherein changing the current operating voltage is performed before changing the current operating frequency if the target operating point is higher than the current operating point.

5. The method of claim 1, wherein changing the current operating voltage is performed in increments.

6. The method of claim 5, wherein each increment is between 10 mV to 50 mV.

7. The method of claim 5, further comprising waiting for a programmable delay period after the current operating voltage is changed by a final one of the increments before commencing changing the current operating frequency.

8. The method of claim 1, further comprising waiting a predefined period between each increment.

9. The method of claim 8, wherein the predefined waiting period is at most 30 ms.

10. The method of claim 1, further comprising waiting for a signal from the phase locked loop circuit for the core clock that indicates that said phase locked loop circuit has been synchronized to the target operating point frequency before restarting the electronic device bus and the core clock.

11. The method of claim 1, wherein determining the target operating point is based on operating parameters of the electronic device selected form the group consisting of an operating temperature of the electronic device and a power consumption for the electronic device.

12. The method of claim 1, wherein determining the target operating point is based on current performance requirements of an operating system for the electronic device.

13. The method of claim 1, wherein the dynamic changing is done in 10 µs or less.

14. The method of claim 1, wherein during the changing of the current operating frequency the electronic device is kept in the active state.

15. An electronic device, comprising:
a first unit to determine a target operating point for the electronic device, the target operating point including a target operating frequency and a target operating voltage; and
a second unit to dynamically change a current operating point for the electronic device including a current operating frequency and a current operating voltage by non-contemporaneously changing the current operating frequency to the target operating frequency and the current operating voltage to the target operating voltage, wherein during the changing of the current operating voltage the electronic device is in an active state, and wherein during changing the current operating frequency, an electronic device bus coupled to the electronic device is stalled, a first clock for the electronic device is stopped, and a phase locked loop circuit for a core clock is set to the target operating frequency by waiting a predefined delay period to allow the phase locked loop circuit for the core clock to synchronize to the target operating frequency before restarting the electronic device bus and the core clock.

16. The electronic device of claim 15, wherein in the active state the electronic device performs one of executing instructions and processing input/output transactions on a bus.

17. The electronic device of claim 15, wherein changing the current operating frequency is performed before changing the current operating voltage if the target operating point is lower than the current operating point.

18. The electronic device of claim 15, wherein changing the current operating voltage is performed before changing the current operating frequency if the target operating point is higher than the current operating point.

19. The electronic device of claim 15, wherein changing the current operating voltage is performed in increments.

20. A system, comprising:
an electronic device;
a memory coupled to the electronic device by a bus;
a first unit to determine a target operating point for the electronic device, the target operating point including a target operating frequency and a target operating voltage; and
a second unit to dynamically change a current operating point for the electronic device including a current operating frequency and a current operating voltage by non-contemporaneously changing the current operating frequency to the target operating frequency and a current operating voltage to the target operating voltage, wherein during the changing of the current operating voltage the electronic device is in an active state, and wherein during changing the current operating frequency, an electronic device bus coupled to the electronic device is stalled, a first clock for the electronic device is stopped, and a phase locked loop circuit for a core clock is set to the target operating frequency by waiting a predefined delay period to allow the phase locked loop circuit for the core clock to synchronize to the target operating frequency before restarting the electronic device bus and the core clock.

21. The system of claim 20, wherein in the active state the electronic device performs one of executing instructions and processing input/output transactions on a bus.

22. The system of claim 20, wherein the second unit changes the current operating frequency before changing the current operating voltage if the target operating point is lower than the current operating point.

23. The system of claim 20, wherein the second unit changes the current operating voltage before changing the current operating frequency if the target operating point is higher than the current operating point.

24. The system of claim 20, wherein the second unit changes the current operating voltage in increments.

25. The system of claim 20, wherein the first and second units are within the electronic device.

26. The system of claim 20, wherein during the changing of the current operating frequency the electronic device is kept in the active state.

27. A computer-readable medium having stored thereon a sequence of instructions which when executed by a computer cause the computer to perform a method comprising:
determining a target operating point for an electronic device, the target operating point including a target operating frequency and a target operating voltage; and
dynamically changing a current operating point for the electronic device including a current operating frequency and a current operating voltage by non-contemporaneously changing the current operating frequency to the target operating frequency and the current operating voltage to the target operating voltage, wherein during the changing of the current operating voltage the electronic device is in an active state, and wherein during changing the current operating frequency, an electronic device bus coupled to the electronic device is stalled, a first clock for the electronic device is stopped, and a phase locked loop circuit for a core clock is set to the target operating frequency by waiting a predefined delay period to allow the phase locked loop circuit for the core clock to synchronize to the target operating frequency before restarting the electronic device bus and the core clock.

28. The computer-readable of claim 27, wherein in the active state the electronic device performs one of executing instructions and processing input/output transactions on a the electronic device bus.

* * * * *

UNITED STATES PATENT AND TRADEMARK OFFICE
CERTIFICATE OF CORRECTION

| | |
|---|---|
| PATENT NO. | : 7,237,128 B2 |
| APPLICATION NO. | : 10/855268 |
| DATED | : June 26, 2007 |
| INVENTOR(S) | : Naveh et al. |

It is certified that error appears in the above-identified patent and that said Letters Patent is hereby corrected as shown below:

In column 10, at line 6, delete "a".

Signed and Sealed this

Fifteenth Day of April, 2008

JON W. DUDAS
*Director of the United States Patent and Trademark Office*